ADDRESS REGISTER

Filed June 26, 1964

INVENTORS
ARTHUR G. SILVER

BY Ronald J. Clark
ATTORNEY

June 27, 1967 A. G. SILVER 3,328,770

ADDRESS REGISTER

Filed June 26, 1964 4 Sheets-Sheet

ADDRESS REGISTER

Filed June 26, 1964 4 Sheets-Sheet 4

| LINE | S12 | S13 | S14 | S15 | S16 | S17 | STAGE POSITIONS |
|---|---|---|---|---|---|---|---|
| A | 0 | 1 | 0 | 9 | 9 | 8 | ORIGINAL ADDRESS |
| B | 10 | 1 | 10 | 9 | 9 | 8 | ORIGINAL ADDRESS IN ADDRESS REGISTER |
| C | | | | | | 1 | ADVANCE STAGE 17 AT BIT RING TWO |
| D | 10 | 1 | 10 | 9 | 9 | 9 | UPDATED ADDRESS |
| E | | | ↑ | | | | RESET STAGE 14 AT BIT RING ONE |
| F | 10 | 1 | — | 9 | 9 | 9 | ADDRESS AFTER RESET |
| G | | | | | | 1 | ADVANCE STAGE 17 AT BIT RING TWO |
| H | 10 | 1 | — | 9 | 9 | 10 | ADDRESS AFTER ADVANCE |
| I | | | | | 1 | | ADVANCE STAGE 16 AT BIT RING THREE |
| J | 10 | 1 | — | 9 | 10 | 10 | ADDRESS AFTER ADVANCE |
| K | | | | 1 | | | ADVANCE STAGE 15 AT BIT RING FOUR |
| L | 10 | 1 | — | 10 | 10 | 10 | ADDRESS AFTER ADVANCE |
| M | | | 1 | | | | ADVANCE STAGE 14 AT BIT RING FIVE |
| N | 10 | 1 | 1 | 10 | 10 | 10 | ADDRESS AFTER ADVANCE |
| O | | | | | | ↑ | RESET STAGE 17 AT BIT RING ONE |
| P | 10 | 1 | 1 | 10 | 10 | — | ADDRESS AFTER RESET |
| Q | 0 | 1 | 1 | 0 | 0 | 0 | ADDRESS WITH BLANKS AND TENS CONVERTED TO ZEROS |

FIG. 3

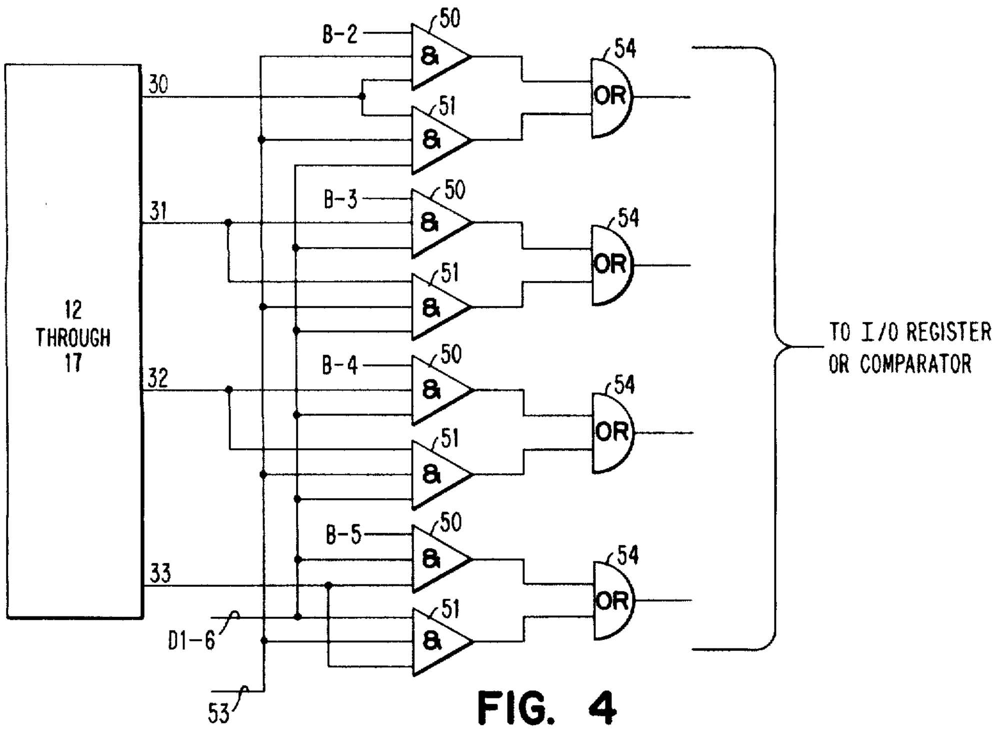

FIG. 4

United States Patent Office 3,328,770

Patented June 27, 1967

3,328,770
ADDRESS REGISTER

Arthur G. Silver, Endicott, N.Y., assignor to International Business Machines Corporation, New York, N.Y., a corporation of New York Filed June 26, 1964, Ser. No. 378,344
8 Claims. (Cl. 340—172.5)

ABSTRACT OF THE DISCLOSURE

The invention pertains to a special-purpose register employed for modifying address indicia. Reset and modifying gates are employed to render the register compatible with the system in which the register is placed.

Figure 1:
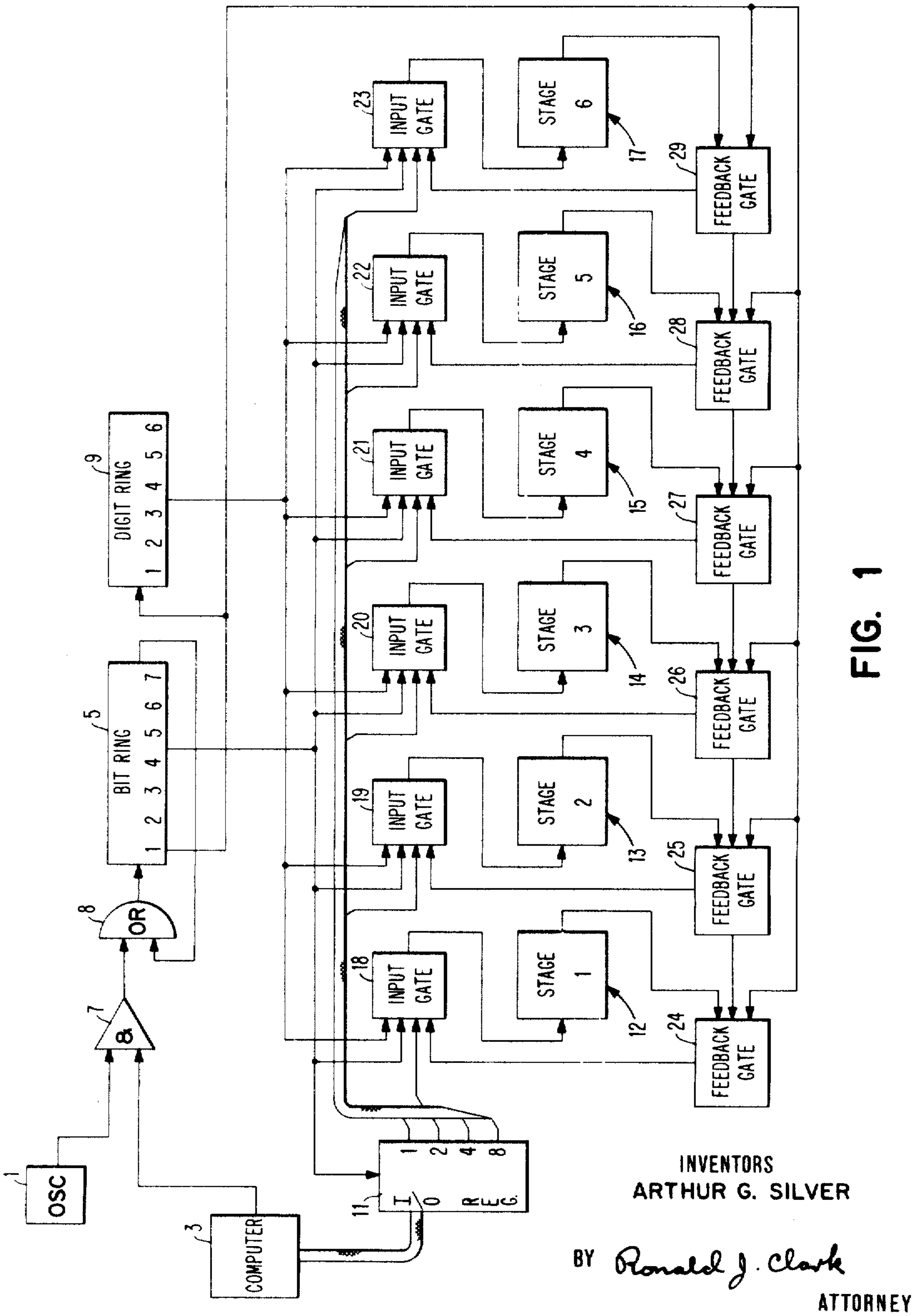

This invention relates to storage registers and more particularly, to a multistage address storage register for storing a plurality of address characters and equipped with interstage feedback circuits for periodically modifying the address characters stored therein.

Generally, a data processing system includes a Random Access File (RAF) or a permanent filing device for storing the great quantity of reference material required by the processor in performing its function. A typical storage device comprises a plurality of magnetic disks, magnetic drums, or closed loop magnetic strips, and their accessing mechanisms. The recording surface of a magnetic disk contains a plurality of concentric tracks physically separate from each other. Moreover, each track is normally subdivided into a plurality of fixed length sections, and each section is used to store a separate message. Additionally, each section is individually addressable and accessible by magnetic read-write transducers usually employed to enter data onto the disks and to detect data written on the disks. Under existing procedures, when information is stored for later use or retrieved for instant use, a single track location is addressed and one of the fixed length sections is selected. Mechanical movements and operations are employed to select the addressed track and electrical comparisons are employed to locate the addressed track.

The address of the initial file section which receives or furnishes a message is transferred to an address register from an associated computer. The address in the address register is compared with each permanently recorded section address on the selected track to locate the addressed section. Thereafter, the address in the address register is periodically modified for each additional section which is involved in the multiple section transfer operation. Prior to the transfer of an additional section of a message between a computer and a newly addressed section of the RAF, the address in the address register is compared with a subsequent section address read from the file module. K. D. Foulger et al. describes such a multiple section transfer system in their copending patent application Ser. No. 383,540, filed June 26, 1964, and entitled "Multiple Section Transfer System," assigned to the assignee of the present invention.

Accordingly, it is an object of the instant invention to provide a multistage address register having interstage feedback circuits for modifying an address stored therein in a predetermined manner.

It is another object of the invention to provide an address storage register for storing file section addresses in binary notation.

It is a further object of the instant invention to provide an address register utilizing a plurality of stages and each stage employing a plurality of stroage elements.

According to these objects, the instant invention contemplates the use of a pair of control rings driven by an oscillator circuit as a means for gating address characters into the storage register and as a means for sequentially modifying the stored address characters. The oscillator operates at the basic frequency of the file control system and drives the first bit ring one position for each oscillator pulse. The second digit ring is responsive to one output signal from the first bit ring, and it advances one position for each complete cycling of the bit ring. Additionally, a central processing unit applies the address characters to the address register through a buffer Input-Output (I/O) register. Address characters are transferred from the I/O register to the corresponding stages of the address register under the control of the output signals of the digit ring. The modification of the address characters is achieved by the combined operation of the output signals of the bit ring and the feedback signals from an interstage feedback circuit.

Figure 2A:
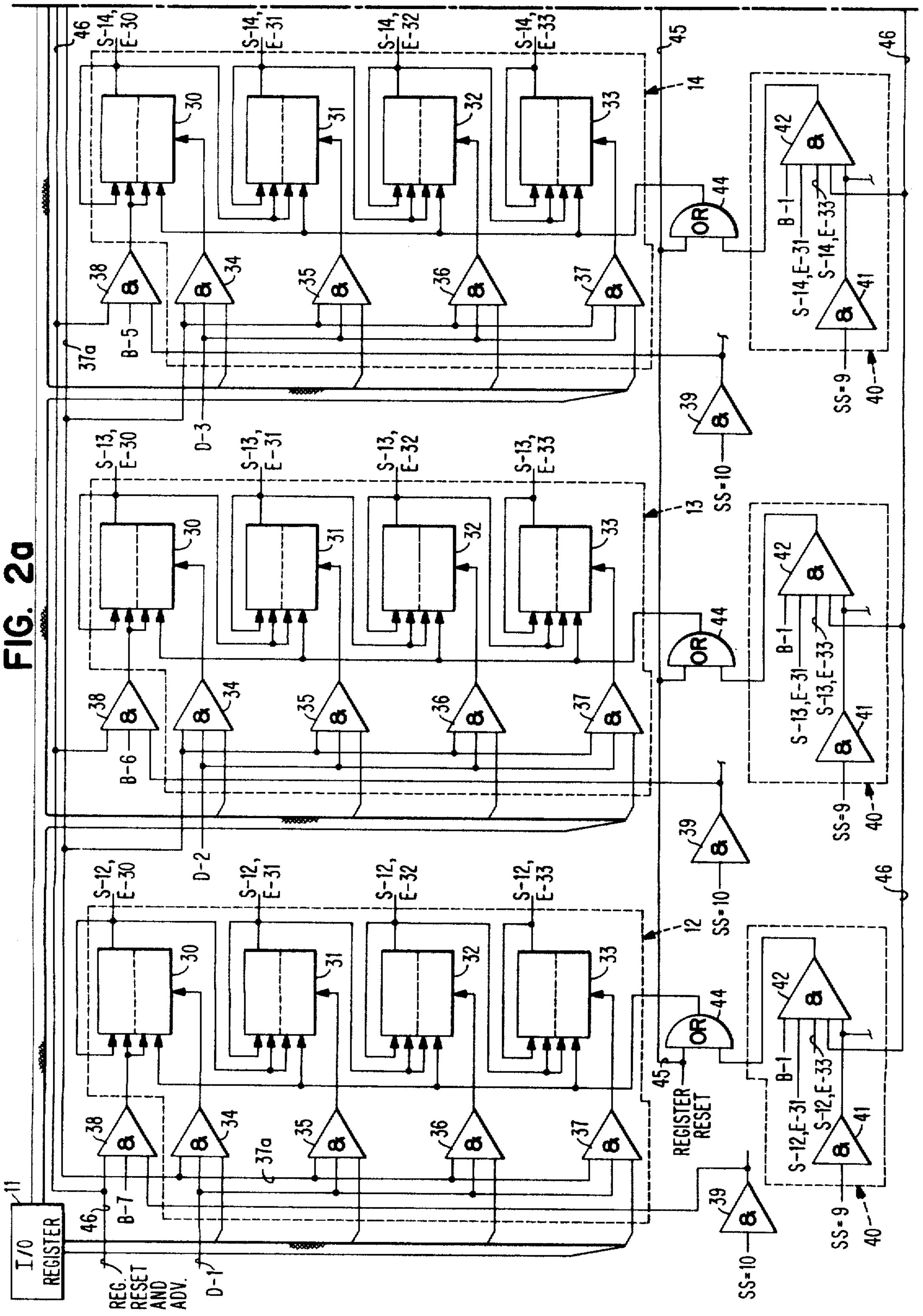
Figure 2B:
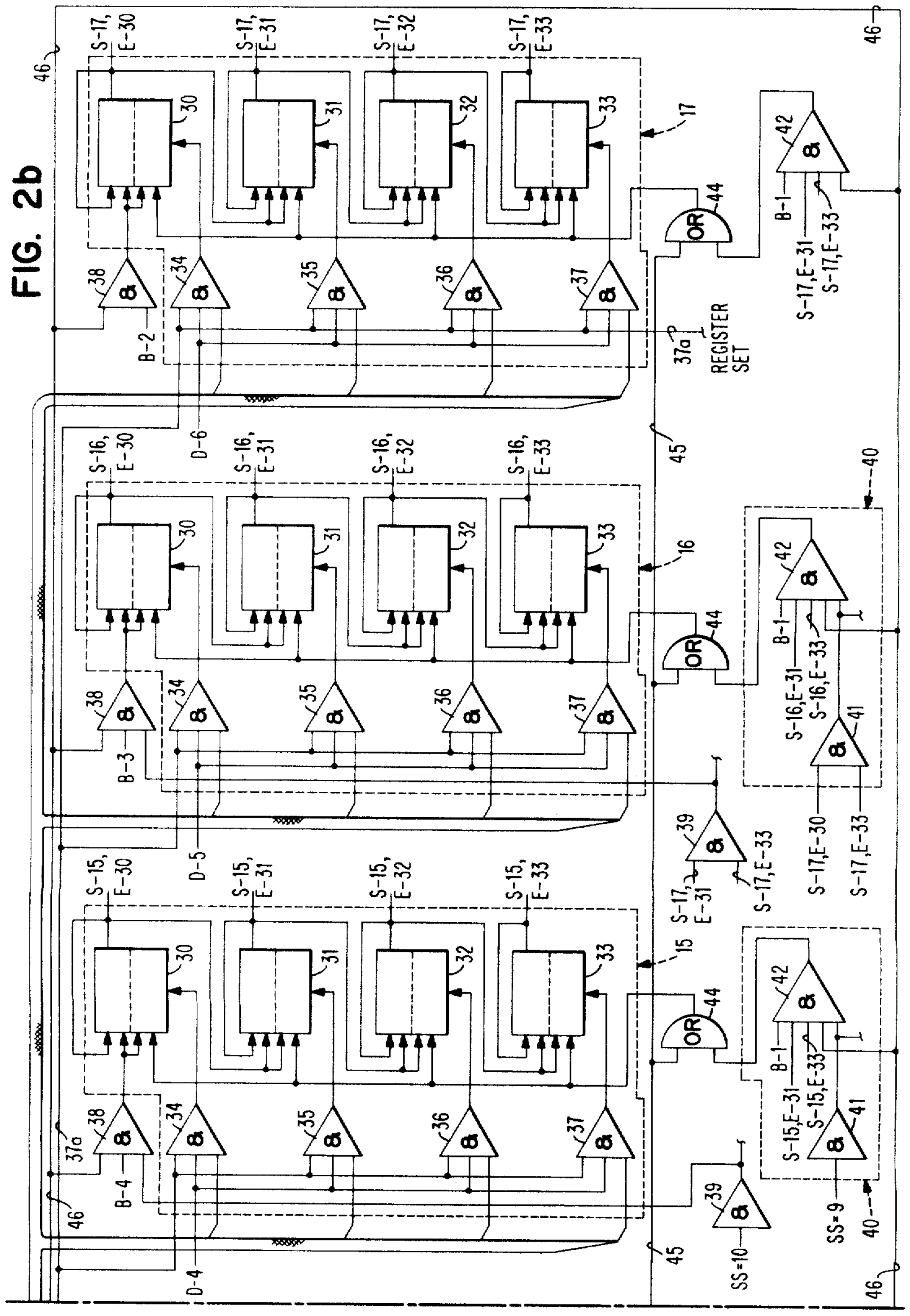

The foregoing and other objects, features and advantages of the invention will be apparent from the following more particular description of a preferred embodiment of the invention, as illustrated in the accompanying drawings; wherein FIG. 1 is a generalized block diagram of the instant invention;

FIGS. 2*a* and 2*b* are schematic diagrams of the address register employed in the instant invention;

FIG. 3 is a schematic diagram showing the manner in which the contents of the address are modified; and FIG. 4 shows the serial parallel output circuit employed in the instant invention.

Referring to FIG. 1, the basic timing frequency of the instant invention is generated by an oscillator 1. The frequency thereof is not controlling in the operation of the instant invention. Generally, the frequency of the signals generated by the oscillator 1 is less than the operating frequency of its associated computer 3. The output of the oscillator 1 is applied to a bit ring 5 by an AND gate 7 and an OR gate 8. The AND gate 7 has a second enabling input signal generated by an operation decode circuit, not shown, within the computer 3 indicating that the computer is to begin a multiple section transfer operation. The bit ring 5 is a standard seven position ring which advances sequentially through all its positions. Position one receives the pulses from the oscillator 1, and the output of position one is employed as the advance signal for a digit ring 9. Additionally, the output signal from position seven of the ring 5 serves as a reset signal to position one of the same ring by the OR gate 8. The control ring 9 is a standard six position ring which advances one position for each signal applied thereto from the bit ring 5. Additionally, the output signal from position six of the digit ring 9 is employed as a reset signal for position one of the same ring. Both the rings 5 and 9 provide a single enabling output signal on their respective output lines at any one time.

The address characters are transferred to and I/O register 11 by the computer 3 when the register 11 is empty and is ready to receive the next address character. Thereafter, each address character is transferred from the I/O register 11 by the output signals of the bit ring 5 and are sequentially entered into a plurality of digit stages 12 through 17 through a plurality of input gates 18 through 23 respectively enabled by the output signals of the digit ring 9. Each of the stages 12 through 23 is equipped with an interstage feedback gate 24 through 29 respectively. Selected outputs of each stage are applied to its corresponding feedback gate. Selected outputs of each feedback gate are applied to its corresponding input circuit, while other outputs of the same feedback gate are applied to the feedback gate of the preceding stage. Additionally, each of the feedback gates 24 through 29 receive the output signal from position one of the bit ring 5. The input gate employs the selected output signals of the feedback gate of the preceding stage and the output signals of the bit ring 5 to modify the contents of that stage.

Referring to FIG. 2a, the first stage 12 of the address register comprises four bistable storage elements 30 through 33 respectively, which are interconnected as a standard binary counter. A representative bistable element suitable for use in the instant invention is a pair of triggers connected as a flip-flop. Each storage element is equipped with an input AND gate 34 through 37 respectively. The output of each AND gate 34 through 37 is applied to its corresponding storage element 30 through 34 respectively as a set signal for entering each address character into its corresponding stages 12 through 17. The remaining stages are equipped in a similar manner.

Each address character is represented by four binary bits which are transferred in parallel from the computer 3 to the I/O register 11 one character or an entire address at a time, depending on the storage capacity of the I/O register 11. The I/O register 11 is a standard circuit and, for the purpose of this description, comprises four storage elements similar to those in the stage 12. The outputs of the I/O register 11 are labeled 1-bit, 2-bit, 4-bit and 8-bit, respectively, corresponding to standard binary notation. These output signals are transferred to the corresponding input gates 34 through 37 in the stage 12 by the output signals of positions two through five of the ring 5. Additionally, these output signals of the I/O register 11 are applied to each of the remaining stages 13 through 17 in a similar manner. The gates 34 through 37 of the stage 12 are simultaneously enabled by the output signal from position one of the ring 9. The gates 34 through 37 of the remaining stages 13 through 17 are enabled by the remaining output signals from postion two through six respectively from the digit ring 9. The AND gates 34 to 37 of each of the stages 12 through 17 have a third input signal applied thereto from the computer 3 by a line 37a. This is a set signal and is generated by the computer to gate the first section address into the address register at the start of a multiple section transfer operation. Therefore, succeeding address characters from the computer 3 are entered into adjacent stages 12 through 17 under the control of the output signals of the ring 9.

Stage 12 of the address register is equipped with a modification input gate 38, an advance feedback gate 39, and a reset feedback circuit 40. Each of the remaining stages 13 through 17 is equipped in a similar manner, except the stage 17, which is not equipped with an advance feedback gate 39. The output of the AND gate 39 is applied as one input to the AND gate 38 of the same stage. The output of the AND gate 38 is applied as an advance signal to the storage element 30 of the same stage. The elements 30 through 33 are connected in such manner that a single input signal advances the contents of the same stage by one in standard binary notation. That is, the output of one storage element serves as the input to the next adjacent storage element. Additionally, each storage element 30 through 33 has a single output signal corresponding to the status of that element. The status being defined as an enabling output signal when the element is in its "one" or "on" stable condition and as a disabling output signal when the element is in its "zero" or "off" stable condition. The "off" output signal also serves as a gating signal to the same side of each of the storage elements 30 through 33 and serves as the "on" set to the next adjacent storage element.

The feedback circuit 40 for the stages 12 through 17 comprises a first AND gate 41 connected to a second AND gate 42. The output of the AND gate 42 is applied as a reset signal to all the storage elements 30 through 33 of the same stage by an OR gate 44, resetting each storage element to its "zero" stable condition. Each of the OR gates 44 has, as a second input signal, a reset signal from the computer 3 on a line 45. This reset signal is generated by the computer 3 prior to the beginning of a multiple section transfer operation.

The AND gate 41 has essentially two input signals; one of which is the "one" output signal from the storage elements 30 and 33 of all succeeding stages. The output of the AND gate 41 indicates that the stage or stages applying input signals thereto are in the equivalent of the nine binary condition, that is, their binary one and binary eight elements are in their "one" condition. The output of the AND gate 41 is applied to the AND gate 42 of the same stage, except the stage 17 which does not employ an AND gate 41.

The AND gate 42 in the stage 17 has four input signals; the first of which is a reset and advance signal from the computer 3 on a line 46, the second of which is the output signal from position one of the bit ring 5, the third of which is the "one" output signal from the storage element 31 of the same stage, and the fourth of which is the "one" output signal from the storage element 33 of the same stage. The reset and advance signal is generated by the computer 3 after the transfer of each message between the computer and the RAF and before the next address compare operation in the same multiple section transfer operation is to be performed. The AND gate 42 in each of the stages 12 through 16 receives the same input signals specified for the AND gate 42 in the stage 17 in addition to the output signal of the AND gate 41 in the same stage.

The AND gate 39 is responsive to the "one" input signal of the storage elements 31 and 33 in any succeeding stage. An enabling output signal from the AND gate 39 indicates that the succeeding stages are in the equivalent of the ten binary condition, that is, their binary two and binary eight elements are in their "one" condition.

The AND gate 38 of each stage has three input signals; the first of which is the register reset and advance signal from the computer 3 by the line 46, the second of which is an output signal from the bit ring 5 and the third of which is the output signal from the AND gate 39. The output signal from positions two through seven of the bit ring 5 are applied to the AND gate 38 in the stages 17 through 12 respectively. The AND gate 38 in the stage 17 does not receive an input signal from an AND gate 39.

The lines carrying all the signals between the separate circuits are not all shown for the purpose of clarity. All input lines are labeled with their place of origin and all the input signals to each of the logic circuits are specified as enabling signals for the purpose of this description. In order to reduce the number of labeled input lines, certain abbreviations are employed. The labels "S.S=10" and "S.S=9" means that all the succeeding stages are in the equivalent of the binary ten and nine conditions respectively. The label "S-15, E-31" applied to an input line in the AND gate 42 of the stage 15 indicates that the AND gate 42 is responsive to an enabling signal from stage 15, storage element 31. Additionally, each output signal from the bit ring 5 and the digit ring 9 is labeled "B-1" and "D-1," respectively, for the first output signal from each ring, respectively. The remaining output signals are labeled accordingly.

FIG. 4 shows a representative stage from the stages 12 through 17. Each of the output signals from this stage is the "one" status signal of the storage elements 30 through 33 in the stage. The output signal from the storage element 30 is applied to a pair of AND gates 50 and 51. The AND gate 50 has two additional input signals; one of which is the respective corresponding output signal of the digit ring 9, and the second of which is from position two of the bit ring 5. The AND gate 51 has two additional input signals applied thereto; one of which is the respective corresponding output signal of the digit ring 9, and the other of which is an enabling output signal from the computer 3 by a line 53 indicating that the contents of each stage is to be read out in parallel. The output of the AND gates 50 and 51 are applied to an OR gate 54.

Each of the additional elements 31 through 33 is equipped in a similar manner, and each of the stages 12 through 17 is equipped in a similar manner. The only difference between adjacent storage elements is found in the input signals to the AND gate 50 associated with the adjacent elements 30 through 33. The AND gate 50 associated with the elements 30 through 33 respectively receives as its second input signal the output signal from position two through five of the bit ring 5 respectively. The only difference between adjacent stages 12 through 17 is the common input signal to the AND gates 50 and 51 in one stage. The AND gates 50 and 51 in the stages 12 through 17 receive an enabling input signal from positions one through six of the digit ring 9 respectively.

In operation, the computer 3 applies a reset signal to all the stages 12 through 17 by the line 45 and the OR gate 44 and resets all the storage elements to their "zero" condition. Simultaneously, the AND gate 7 is enabled and oscillator pulses are applied to the bit ring 5 setting the bit rings 5 and 9 to position one. Additionally, the computer 3 furnishes the register set enabling signal to the AND gates 34 through 37 of each of the stages 12 through 17 by the line **37*a* and it applies an address character in a 4-bit binary code to the I/O register 11. Each of the bits is temporarily stored in the four positions of the register 11. The register 11 transfers any enabling signal stored in its 1-bit position, 2-bit position, 4-bit position and 8-bit position to the AND gates 34 through 37 respectively of each of the stages 12 through 17 under the control of the enabling signals from positions two through five of the ring 5. The digit ring 9 applies its first enabling signal from its position one to the AND gates 34 through 37 of the stage 12 to gate the first character of the section address into the storage elements 30 through 33 of the stage 12. As the digit ring 9 advances through all its six positions in response to the advance signals applied thereto from position one of the bit ring 5, each successive address character is transferred to the remaining stages 13 through 17** in a similar manner.

Once the address has been transferred to the stages 12 through 17 of the address registers, the contents of the address registers are modified after the transfer of each record in a multiple section transfer operation as described in the previously mentioned patent application. However, for the purpose of this description, it is only necessary to recite that, after each section transfer operation, the computer applies a register reset and advance signal to each of the AND gates 38 of each stage 12 through 17 respectively. The AND gate 38 of the stage 17 has as its second input enabling signal the output signal of position two of the bit ring 5. The output of the AND gate 38 of this stage advances the contents of stage 20 one position.

Referring to FIG. 3, line A, there can be seen the schematic diagram of the contents of the stages 12 through 17 of the address register. As an example of section address modification, the section address gated into the address register is specified as 010998 for the purpose of this description. This address demonstrates the various conditions encountered during a modification operation. The 0's in the stages 12 and 14 positions of the address register enter the register from the I/O register 11 as 10's, binary eight and two as shown in line B.

When the advance gate 38 of stage 17 responds to the reset and advance signal from the computer and to the output signal of position two of the bit ring 5, the binary one storage element 30 of the stage 17 is set to its "one" condition. This advances the contents of this stage from eight to nine, as shown in line D. This is the only position of the register affected by the advance as the bit ring 5 cylcles through all its positions in this particular address modification operation.

The input signals to the AND gate 41 of the stage 14 indicate that the succeeding stages are all in the equivalent of the binary nine condition. Additionally, the input signals "S–14, E–31" and "S–14, E–33" to the AND gate 42 indicate that the stage 14 is in the equivalent of the binary ten condition. Therefore, the output signal of position one of the bit ring 5 resets all the storage elements 30 through 33 of the stage 14 to their "zero" condition by the OR gate 44.

When the contents of the address register again require an additional modification of one, after the completion of the next section transfer operation, an advance pulse is applied to the storage element 30 of stage 17 by the AND gate 38 of the same stage in a similar manner as described hereinbefore. This input signal resets the binary one storage element 30 of stage 17, as shown in lines G and H of FIG. 3. The storage element 30 changing to its "zero" condition furnishes an "on" set to the binary two storage element 31 that is gated by its own "off" output. The binary eight storage element 33 remains on, therefore, stage 17 now contains the equivalent of a binary ten, the elements 31 and 33 being "on" representing the binary two and eight respectively.

With the advancing of the bit ring 5 to its position three, the stage 16 advances from the binary nine condition to the binary ten condition, as shown in lines I and J of FIG. 3, in the same manner as the stage 17. This advance occurs when the inputs to the AND gate 39 of this stage are furnished by the stage 17.

With the advancing of the bit ring 5 to its position four, the stage 15 advances from the binary nine condition to the binary ten condition, as shown in lines K and L of FIG. 3. This advance occurs when the inputs to the AND gate 39 of this stage are furnished by the stages 16 and 17.

The storage element 30 of the stage 14 is changed to its "one" condition when the bit ring 5 advances to its position five and when the input signals to the AND gate 39 of this stage are furnished by the stages 15, 16 and 17 as shown in lines M and N of FIG. 3.

All the storage elements 30 through 33 in stage 17 are reset to their binary "zero" condition in preparation to the next modification operation when the bit ring advances to its position one by the AND gate 42 as shown in lines O and P of FIG. 3.

The remaining stages of the address register are not affected by the advance. However, when the input requirements of their respective modification gate 38, advance feedback gate 39 or their reset feedback circuit 40 are present, these remaining stages are modified in a similar manner.

Referring to FIG. 4, the output from the register can be taken in two types of output operations; first it can be taken serially by bit and serially by character, or second it can be taken parallel by bit and serially by character. The first output operation is controlled by the combined output signals of the bit ring 5 and the digit ring 9, while the second operation is controlled by the combined output signal of the digit ring 9 and the enabling output signal from the computer 3 requiring a parallel by bit output signal. The first output operation is useful in address comparisons with section addresses read from the selected file as described in the aforementioned patent application to locate an addressed section file. The second output operation is useful in transferring the address in the register back to the computer 3 through the I/O register 11.

While the invention has been particularly shown and described with reference to a preferred embodiment thereof, it will be understood by those skilled in the art that various changes in form and details may be made therein without departing from the spirit and scope of the invention.

What is claimed is:

1. An address register comprising
a plurality of stages, each of said stages including a plurality of storage elements interconnected as a counter and generating respective output signals,
a source of signals for advancing each of said plurality of interconnected storage elements,
a modifying gate in each of said stages responsive to said signals and connected to one of said storage elements,
an advance feedback gate for those particular stages having at least one succeeding stage and responsive to certain of said output signals from said storage elements in all such respective succeeding stages for enabling said advance gate of such particular stage, and
a reset feedback gate for each stage responsive to certain of said output signals of said storage elements in such stage and in any succeeding stage for resetting such stage.

2. An address register as recited in claim 1, wherein said feedback reset gate further includes,
a first gate responsive to certain of said output signals of said storage elements in any of said succeeding stages, and
a second gate responsive to said first gate and to certain of said output signals of said storage elements in such stage for resetting such stage.

3. In a data processing system employing a computer as a source of address characters, an address register for modifying said address characters comprising,
a plurality of stages, each including a plurality of storage elements interconnected as a counter and generating respective output signals,
a source of signals for gating the address characters into each of said stages,
an input AND gate connected to each of said storage elements and responsive to said gating signals and the address characters for selectively transferring the address characters to each of said stages,
a second source of signals for advancing said counters,
a modifying gate in each of said stages responsive to said advance signals and connected to one of said storage elements,
an advance feedback gate for those particular stages having at least one succeeding stage and responsive to certain of said output signals from said storage elements in all such respective succeeding stages for enabling said advance gate of such particular stage,
a first reset feedback gate for each stage responsive to certain of said output signals of said storage elements in any of said succeeding stages, and
a second reset feedback gate for each stage responsive to said first reset feedback gate and to certain of said output signals of said storage elements in such stage for resetting such stage.

4. An address register comprising,
a plurality of stages, each including a plurality of storage elements interconnected as a binary counter and generating respective output signals,
said output signals including at least those signals indicating that the binary counter of each stage contains the equivalent of a binary nine or ten,
a source of signals for advancing each of said counters,
a feedback advance gate for those particular stages having at least one succeeding stage and responsive to said output signals from said storage elements in all such respective succeeding stages containing the equivalent of a binary ten for generating an advance-enabling output signal,
a modifying gate in each of said stages responsive to said advance signals and said advance-enabling signal of said feedback gate in such stage and connected to one of said storage elements in such stage, and
a feedback reset gate for each stage responsive to said output signals of such stage indicating that said binary counter of such stage contains the equivalent of a binary ten and responsive to said output signals in any succeeding stage indicating that said binary counter of all of said succeeding stages contains the equivalent of a binary nine for resetting such stage.

5. In a data processing system employing a computer as a source of address characters, an address register for modifying said address characters comprising,
a plurality of stages, each including a plurality of storage elements interconnected as a binary counter and generating respective output signals,
said output signals including at least those signals indicating that the binary counter of each stage contains the equivalent of a binary nine or ten,
a source of signals for gating the address characters into each of said stages,
an input AND gate connected to each of said storage elements and responsive to said gating signals and the address characters for selectively transferring the address characters to each of said stages,
a second source of signals for advancing said counters,
a feedback advance gate for those particular stages having at least one succeeding stage and responsive to said output signals from said storage elements in all such respective succeeding stages containing the equivalent of a binary ten for generating an advance-enabling output signal,
a modifying gate in each of said stages responsive to said advance signals and said advance-enabling signal of said feedback gate in such stage and connected to one of said storage elements in such stage,
a first reset feedback gate for each stage responsive to said output signals in any succeeding stage indicating that the binary counter in such stage contains the equivalent of a binary nine for generating a reset enabling output signal, and
a second reset feedback gate for each stage responsive to said reset signal and to said output signals of such stage indicating that said binary counter in such stage contains the equivalent of a binary ten for resetting such stage.

6. An address register as recited in claim 5 and further including,
means connected to said storage elements and responsive to said first and second sources of signals for transferring said modified address from said storage elements serially by bit and serially by character.

7. An address register as recited in claim 5 and further including,
a third source of gating signals, and
means connected to said storage elements and responsive to said first and third sources of signals for transferring said modified address from said storage elements parallel by bit and serially by character.

8. An address register as recited in claim 5 and further including,
a third source of gating signals,
first means connected to said storage elements and responsive to said first and second sources of signals for transferring said modified address from said storage elements serially by bit and serially by character, and
second means connected to said sorage elements and responsive to said first and third sources of signals for transferring said modified address from said storage elements parallel by bit and serially by character.

No references cited.

ROBERT C. BAILEY, *Primary Examiner.*

G. D. SHAW, *Assistant Examiner.*